(12) United States Patent
Meschter

(10) Patent No.: US 7,875,382 B2
(45) Date of Patent: Jan. 25, 2011

(54) BATTERY

(75) Inventor: John Eric Meschter, New York, NY (US)

(73) Assignee: International Battery, Inc., Allentown, PA (US)

( * ) Notice: Subject to any disclaimer, the term of this patent is extended or adjusted under 35 U.S.C. 154(b) by 239 days.

(21) Appl. No.: 12/200,245

(22) Filed: Aug. 28, 2008

(65) Prior Publication Data

US 2010/0055557 A1    Mar. 4, 2010

(51) Int. Cl.
| | |
|---|---|
| H01M 2/24 | (2006.01) |
| H01M 2/26 | (2006.01) |
| H01M 2/28 | (2006.01) |
| H01M 4/62 | (2006.01) |

(52) U.S. Cl. .................. 429/161; 429/149; 429/158; 429/159

(58) Field of Classification Search .......... 429/161
See application file for complete search history.

(56) References Cited

U.S. PATENT DOCUMENTS

| | | | |
|---|---|---|---|
| 4,209,576 A | | 6/1980 | Heurtel |
| 5,096,667 A | | 3/1992 | Fetcenko et al. |
| 5,104,617 A | | 4/1992 | Fetcenko et al. |
| 5,238,756 A | | 8/1993 | Fetcenko et al. |
| 5,277,999 A | | 1/1994 | Ovshinsky et al. |
| 5,472,802 A | | 12/1995 | Holland et al. |
| 5,773,958 A | | 6/1998 | Gow et al. |
| 5,879,831 A | | 3/1999 | Ovshinsky et al. |
| 6,027,831 A | * | 2/2000 | Inoue et al. ............ 429/181 |
| 6,242,128 B1 | | 6/2001 | Tura et al. |
| 6,255,015 B1 | | 7/2001 | Corrigan et al. |
| 6,387,567 B1 | * | 5/2002 | Noh ....................... 429/211 |
| 6,689,510 B1 | | 2/2004 | Gow et al. |
| 6,878,485 B2 | | 4/2005 | Ovshinsky et al. |
| 6,939,642 B2 | * | 9/2005 | Asahina et al. ........ 429/161 |
| 7,264,901 B2 | | 9/2007 | Gow et al. |
| 2002/0025474 A1 | | 2/2002 | Chikada |

(Continued)

FOREIGN PATENT DOCUMENTS

KR         2008009351 A  *  1/2008

OTHER PUBLICATIONS

Machine translation of KR 2008009351 A, Choi et al., Jan. 2008.*

Primary Examiner—Robert Hodge
Assistant Examiner—Sean P Cullen
(74) Attorney, Agent, or Firm—Design IP

(57) ABSTRACT

The present invention provides battery cell having low resistance internal connections and compact, low volume terminal connections in order to maximize power-producing volume. The battery of the present invention may be created using a novel fold geometry to fold electrode tabs into compact, low profile tabs having a low total volume. The battery cell provides a means for equalizing path lengths from each electrode active area to the point of connection to the terminal and also reducing path length, thereby further reducing resistance of the battery. The connection means of the present invention consumes less internal battery space than connection means of prior art electrode stacks. Accordingly, the electrode stack of the present invention disposes more or larger battery cells in the battery than the prior art and thus provides more power than the prior art battery. The present invention is designed to overcome prior art difficulties in preparing a battery.

17 Claims, 12 Drawing Sheets

U.S. PATENT DOCUMENTS

| | | |
|---|---|---|
| 2003/0059670 A1 | 3/2003 | Bechtold et al. |
| 2003/0170535 A1 | 9/2003 | Watanabe et al. |
| 2003/0228516 A1 | 12/2003 | McDermott |
| 2003/0232243 A1 * | 12/2003 | Hong .................. 429/161 |
| 2004/0197647 A1 | 10/2004 | Murashige et al. |
| 2005/0191528 A1 | 9/2005 | Cortes et al. |
| 2005/0210660 A1 | 9/2005 | Li |
| 2006/0110658 A1 | 5/2006 | Zhu et al. |
| 2007/0212603 A1 | 9/2007 | Nathan et al. |

* cited by examiner

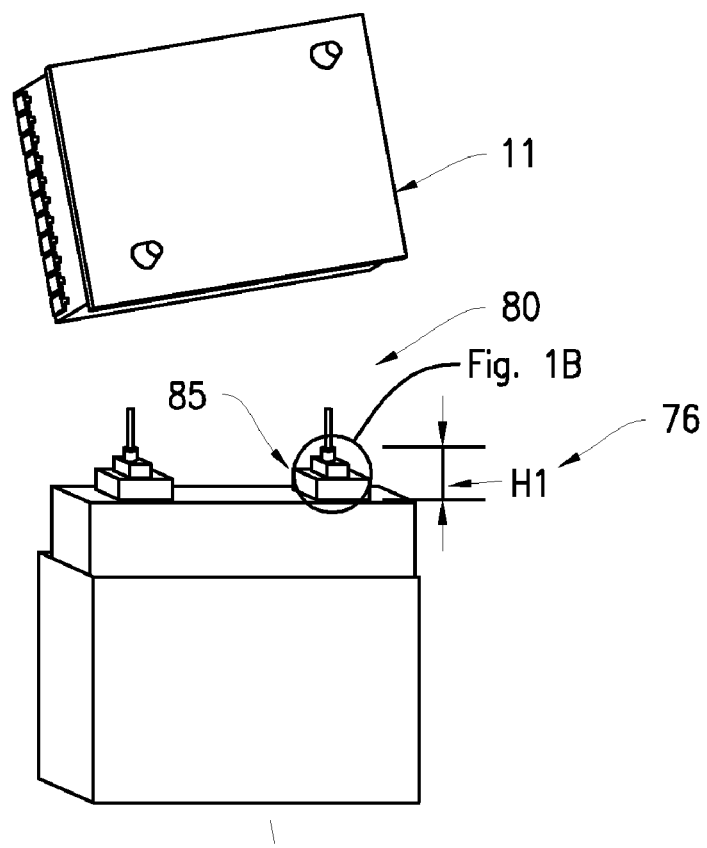
(PRIOR ART)
FIG. 1A
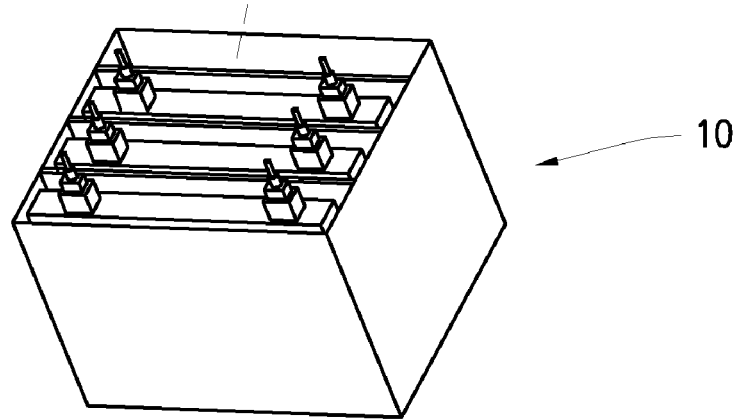

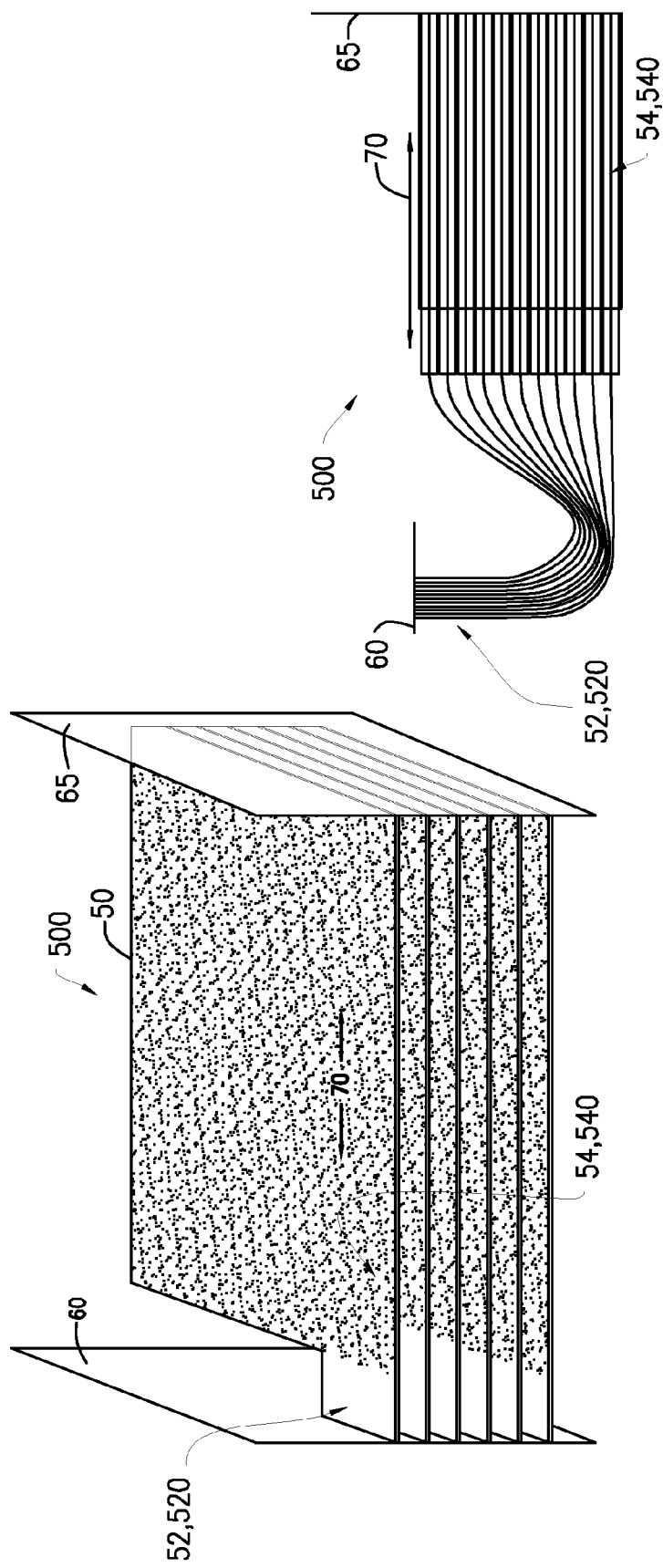

BATTERY

PRIORITY AND RELATED APPLICATION

Not Applicable

FIELD OF THE INVENTION

The present invention relates to batteries. More particularly, the present invention relates to battery containment embodiments suitable for maximizing internal space and providing maximum power output.

BACKGROUND OF THE INVENTION

Rechargeable batteries are used in a variety of industrial commercial and military applications such as fork lifts, uninterruptible power supplies, electric vehicles and military weapons systems.

Rechargeable lead-acid batteries are a useful power source for starter motors for internal combustion engines. However, their low energy density (about 30 wh/kg) and their inability to perform at high temperature, makes them an impractical power source for electric vehicles (EV), hybrid electric vehicles (HEV) and other systems requiring a high energy density source. Electric vehicles using lead-acid batteries have a short range before requiring recharge, require about 6 to 12 hours to recharge and contain toxic materials. In addition, electric vehicles using lead-acid batteries have sluggish acceleration, poor tolerance to deep discharge, and a battery lifetime of only about 20,000 miles.

Nickel-metal hydride batteries ("Ni-MH batteries") are far superior to lead-acid batteries, and Ni-MH batteries are currently used in electric vehicles, hybrid vehicles and other forms of vehicular propulsion. For example, Ni-MH batteries, such as those described in U.S. Pat. No. 5,277,999, the disclosure of which is hereby incorporated herein by reference, have a much higher energy density than lead-acid batteries, can power an electric vehicle over 250 miles before requiring recharge, can be recharged in 30 minutes, and contain no toxic materials.

Extensive research has been conducted in the past into improving the electrochemical aspects of the power and charge capacity of Ni-MH batteries, which is discussed in detail in U.S. Pat. Nos. 5,096,667, 5,104,617, 5,238,756 and 5,277,999, the contents of which are all hereby incorporated herein by reference.

The mechanical and thermal aspects of the performance of Ni-MH batteries have important aspects of operation. For example, in electric vehicles and in hybrid vehicles, the weight of the batteries is a significant factor. For this reason, reducing the weight of individual batteries is a significant consideration in designing batteries for electric and hybrid vehicles. Battery weight should be reduced while still affording the necessary mechanical requirements of the battery (i.e. ease of transport, ruggedness, structural integrity, etc.).

Electric vehicle and hybrid vehicle applications include a critical requirement for thermal management. Individual electrode stacks are placed together in close proximity and many stacks are electrically coupled together. Therefore, since there is an inherent tendency to generate significant heat during charge and discharge, a workable battery design for electric and hybrid vehicles is judged by whether or not the generated heat is sufficiently controlled. Sources of heat are primarily twofold. First, ambient heat due to the operation of the vehicle in hot climates; second, resistive or $I^2R$ heating known as and hereinafter referred to as "joule heating" on charge and discharge, where I represents the current flowing into or out of the battery and R is the resistance of the battery.

Batteries have been developed which reduce the overall weight thereof and incorporate the necessary thermal management needed for successful operation in electric and hybrid vehicles and other applications, without reducing its energy storage capacity or power output. One such battery design is a monoblock battery. Monoblocks are multicavity packaging embodiments in which the cell cavities are all contained within one enclosure. An example of a monoblock battery is provided in U.S. Pat. No. 6,255,051 issued to Corrigan et al. on Jul. 3, 2001, the contents of which are hereby incorporated herein by reference. Another example of a monoblock battery is provided in U.S. Pat. No. 6,689,510 issued to Gow et al. on Feb. 10, 2004, the contents of which are hereby incorporated herein by reference. Another example of a monoblock battery is provided in U.S. patent application Ser. No. 09/861,914, now U.S. Pat. No. 7,264,901 issued to Gow et al. on Sep. 4, 2007, the disclosure of which is hereby incorporated herein by reference.

Polymers are widely used as materials of choice in prismatic battery enclosures due to advantages including lower cost, lower weight and easier manufacturability when compared to metal enclosures. In order to ensure that such a battery fulfills life expectations it is important to transfer heat away from the battery. Although polymers typically have excellent volume resistivity and dielectric properties, poor thermal conductivity is a drawback. Currently, there exists a need in the art for battery case having a design that may be easily modified for a plurality of applications and provide effective thermal management and mechanical stability.

FIG. 1A illustrates a battery of the prior art with an electrode stack 76 exploded from a case 10 and cover 11. The prior art electrode stack 76 comprises two half electrode stacks that are composed of a plurality of individual electrodes wherein electrode tabs 52 are connected using a terminal 80 and connection means 85. Reference H1 shows that electrode tabs of the prior art electrode stack are not compact and occupy maximum space within a battery. Reference H1 also identifies the height or vertical space occupied by the connection means 85. The connection means 85 is internal to the hermetically sealed portion of the battery. The connection means 85 passes through the case wall and makes the electrical path to the external terminal. The connection means 85 also gathers together and connects the plurality of electrodes of the electrode stack 76 to the terminal 80.

Non-limiting examples of connection means 85 include bolts, screws, nuts, rivets, welds, solder, wiring, copper blocks, aluminum blocks, plates, crimps, folds and so forth. In the prior art, electrode tabs 52 are pinched vertically and clamped to a block of the connection means 85, see FIG. 1B. The distance from the power generating electrode active area 54 of each electrode to the point of connection of the electrode tabs 52 to terminal 80 varies. The path length to terminal 80 of the outer most electrodes traverse a greater distance than the inner most electrodes. Accordingly, the electrical resistance paths for the electrodes are unequal and, as a result, current drawn from each electrode in the parallel connection is unequal across all electrodes.

The space consumed by the connection means 85 of the prior art is represented by the vertical space H1. The volume occupied within the case 10 by the connection means 85, and approximated by the height H1 and the internal horizontal dimensions of the case, is a volume not occupied by the power producing elements of the electrode stack, the electrode active area 54. The electrode active area 54 is that part of each electrode having a coating and being wetted by electrolyte.

The connection means 85 necessarily gathers and connects the uncoated electrode tabs 52 to form an electrical circuit connection to the terminal 80 and the external terminals of the battery. Thus, to the extent that the volume occupied by the connection means 85 can be minimized, the volume of the power producing elements 54 of the electrode stack can be maximized. In the prior art, because of the large connection means 85, which occupy on the order of 17-20% of the cell volume, the power producing elements 54, the electrode active area, of the electrode stack are smaller. The remaining unoccupied space in the case 10 is filled with electrolytes. The vertical space H1 occupied by the connection means 85 does nothing to contribute to providing power and instead prevents filling the battery with larger electrodes.

The excessive vertical space or height H1 occupied by connection means 85 and similar connection means is a problem recognized in the prior art. Specifically, issues involving connecting electrodes are known industry-wide problems that have yet to be addressed. Accordingly, it is an object of the present invention to fill the internal battery space with larger battery cells or electrodes forming electrode stacks. It is an object of the invention to maximize internal battery space with power producing electrode stack elements. It is also an object of the invention to use connection means that occupy less vertical space within a battery. It is also an object of the present invention to equalize the electrical resistance path for electrodes. Furthermore, it is an object of the present invention to equalize current flow through each electrode in the parallel terminal connection across all electrodes. Furthermore, it is an object of the invention to have low resistance, compact connections resulting in a battery with low internal resistance.

The present invention overcomes deficiencies in the prior art by providing solutions to problems cited above as well as other problems.

BRIEF SUMMARY OF THE INVENTION

The present invention describes a battery having electrode stacks with low resistance internal connections. Each electrode stack comprises two half electrode stacks that are connected together in a parallel electrical circuit configuration using a connection means. Specifically, each half stack comprises a plurality of electrodes that are compressed together into an electrode stack. The electrode has an electrode tab and an electrode active area. In the electrode stack, the plurality of electrode active areas form an electrode active area stack and the plurality of electrode tabs form an electrode tab stack. The electrode tab stacks of two half electrode stack are compressed to form an electrode stack.

The present invention provides a low internal resistance battery cell in which the path lengths from each electrode active area to the point of connection to the terminal are equal. This equal path length creates equal electrode resistance to the terminal, a consequence of which is that current flow in each electrode of the parallel terminal circuit connection is equal across all of the electrodes in the connection. A novel fold geometry is used to fold electrode tabs into compact, low profile tabs having a low total volume. The present invention is designed to overcome prior art difficulties in creating low resistance internal connections and compact, low volume terminal connections in order to maximize power-producing volume.

BRIEF DESCRIPTION OF THE DRAWING

FIG. 1A shows an exploded view of a battery of the prior art.

FIG. 6A is a half electrode stack of the present invention.

FIG. 6B is a view of a half electrode stack of the present invention that is folded.

DETAILED DESCRIPTION OF THE INVENTION

Figure 2:
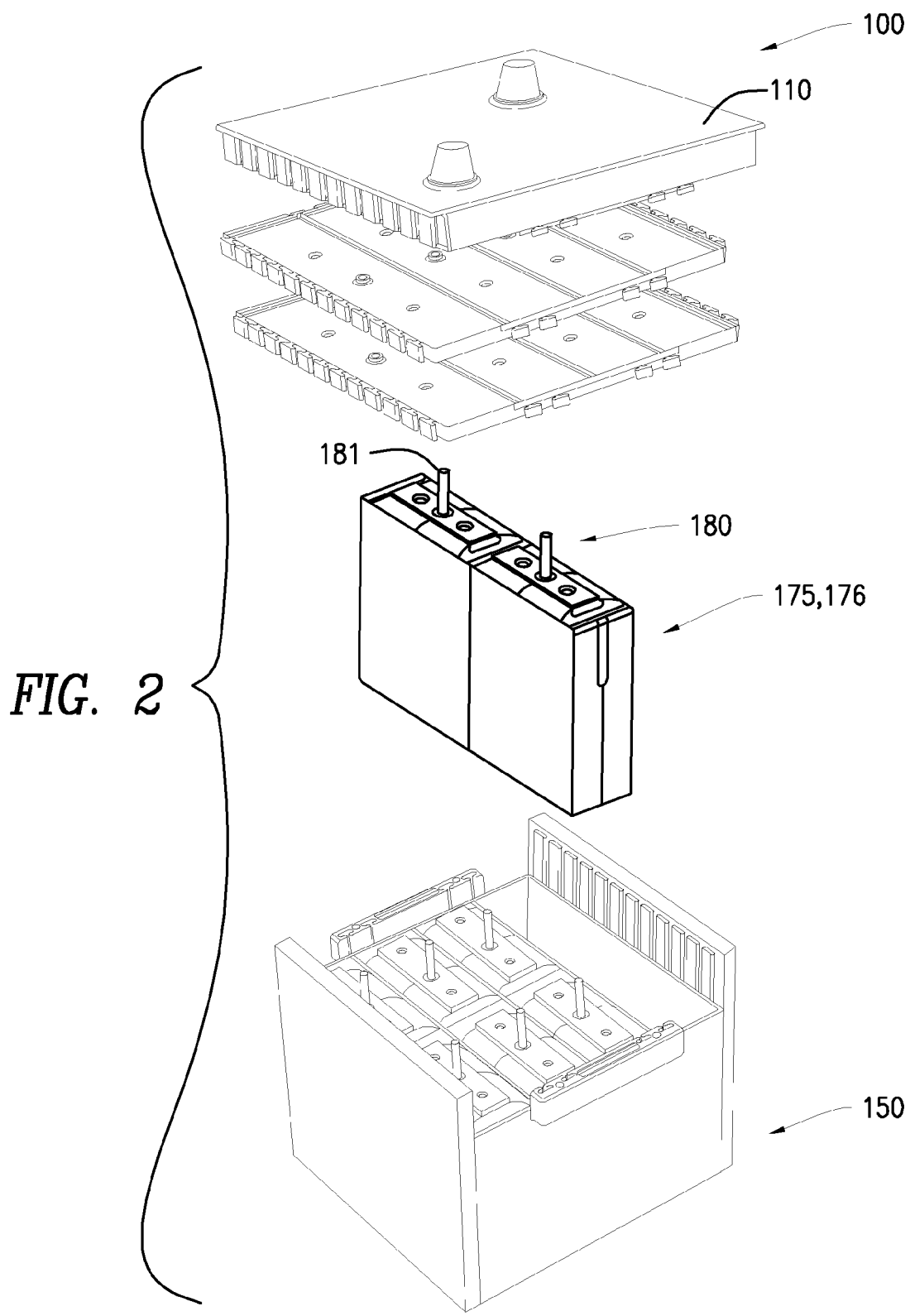
FIG. 2 shows a battery of the present invention wherein an electrode stack is exploded from a case of the present invention.
Figure 3:
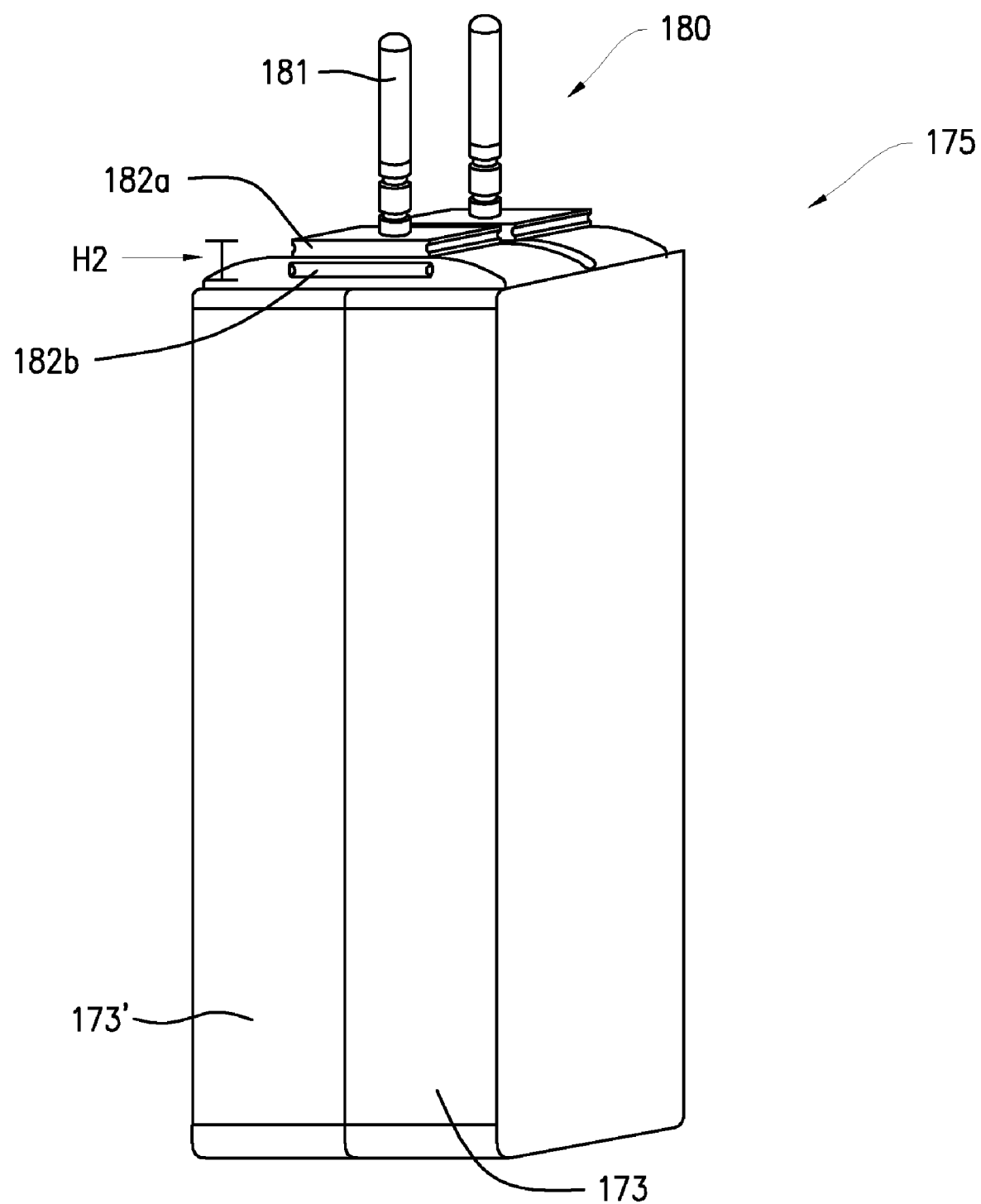
FIG. 3 shows an electrode stack of the present invention.
Figure 4:
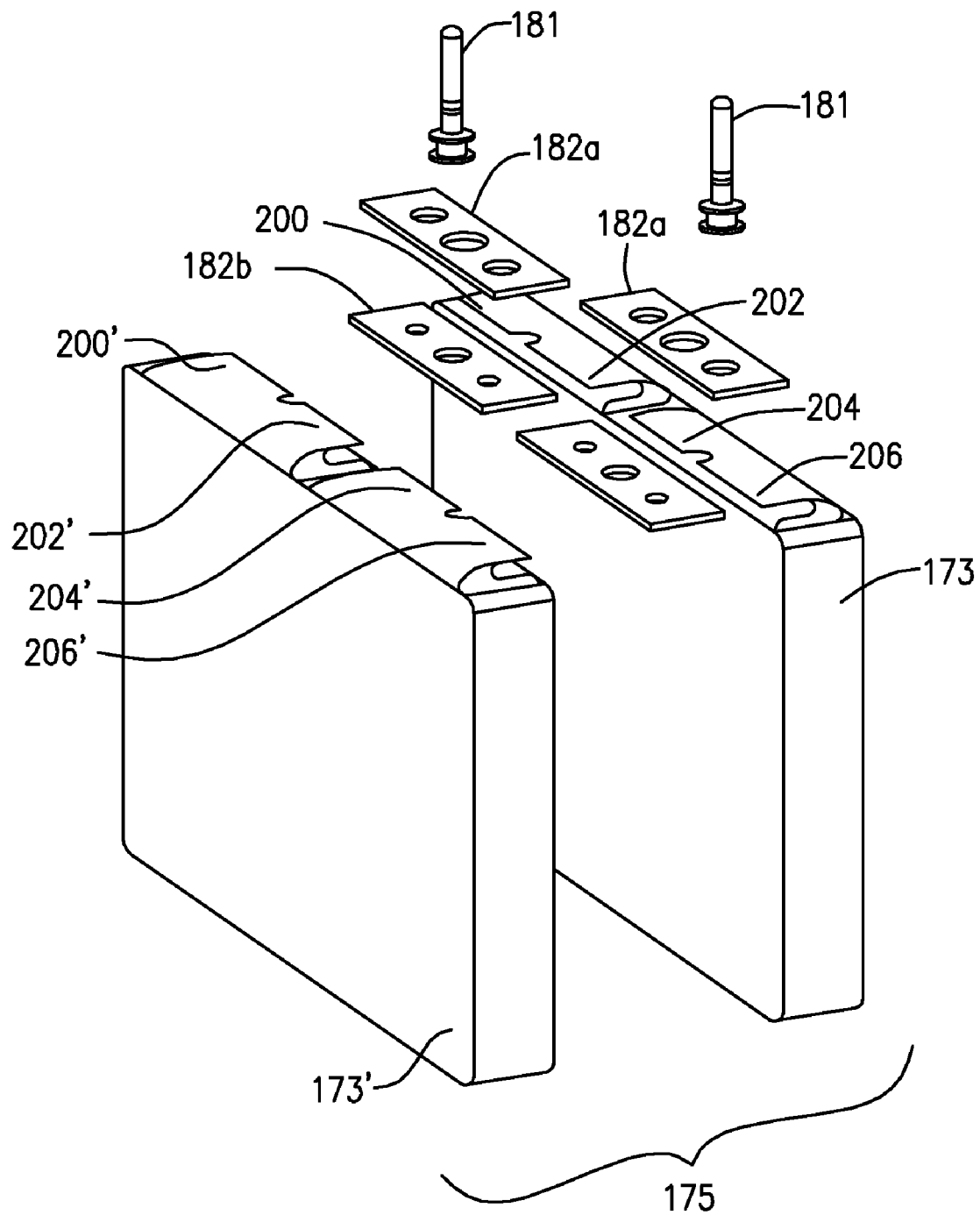
FIG. 4 shows an exploded view of an electrode stack of FIG. 3 wherein terminals including terminal posts and terminal brackets and an electrode stack is exploded.

FIGS. 2-4 show an electrode stack 175 of a battery according to the present invention. The electrode stack 175 may include a leaf spring and a backing plate to form an electrode stack assembly 176. The electrode stack 175 is comprised of two-half electrode stacks 173, 173' and two terminals 180. Each terminal 180 includes terminal post 181, top bracket 182*a* and bottom bracket 182*b*. The top bracket 182*a* and bottom bracket 182*b* may generally be referred to as connection means.

Each half electrode stack 173, 173' has at least one anode (copper) electrode, and at least one cathode (aluminum) electrode. Each half electrode stack 173, 173' comprises a plurality of electrodes 50, preferably organized where aluminum electrodes (also known as cathode electrodes) alternate with copper electrodes (also known as anode electrodes), and all adjacent electrodes are separated from each other by separator material and an intervening electrode of the opposite type. Thus cathode electrodes are separated from each other by anode electrodes and separator material, and anode electrodes are separated from each other by cathode electrodes and separator material. Each electrode has a slurry coated electrode active area 54 and an uncoated electrode tab 52. The plurality of electrodes 50 are stacked together to form an electrode stack 500, wherein the plurality of electrode active areas 54 are aligned and the plurality of electrode tabs 52 are aligned to form an electrode active area stack 540 and an electrode tab stack 520, respectively. See generally FIGS. 6A and 6B. Electrodes 50 are manufactured to be identical in order to minimize sorting, orienting, sequencing and other order-related stacking requirements that arise if electrodes 50 vary within an electrode stack 500. Accordingly, identically aligned anode or cathode electrodes 50 permit corresponding features of neighboring anode or cathode electrodes to align. For instance, pre-punched holes of one anode electrode 50 will align with identically pre-punched holes on an adjacent anode electrode 50.

Referring back to FIG. 4, half stacks 173, 173' are shown having four electrode tab stacks. For illustrative purposes, tabs 200, 202 of half stack 173 are designated aluminum tab stacks and tabs 204, 206 are adjacent copper tab stacks. Likewise, in half stack 173' adjacent tabs 200', 202' are aluminum and adjacent tabs 204', 206' are copper. In a preferred embodiment, the aluminum electrode tab stacks 200, 202, 200', 202' are located at one end and one side, proximal to a corner of the respective half stacks and the copper electrode tab stacks 204, 206, 204', 206' at the opposite end and side of the respective half stacks. However, the electrode tab 52 may be disposed at any desired location on the total area of the electrode 50. These four tab stacks may be made by bifurcating two single tab stacks in half. In some embodiments each half stack 173, 173' may have only two electrode tab stacks, one copper tab stack and one aluminum tab stack. In the present invention, each electrode tab stack is folded to occupy minimal battery volume and the tabs in the stacks are compressed against each other to make good electrical connections using connection means, 182a, 182b.

Prior to being formed into electrode stacks 173, 173', the electrode tabs 52 are straight, see FIGS. 6A & 6B. To form the electrode stacks 173, 173' of the present invention, each electrode tab 52, 520 is folded generally at the juncture where the electrode tab meets the electrode active area 54, 540. It should be noted that electrode tab stack 520, refers in general to the folded and compressed electrode tab stacks formed to make the electrode stacks 173, 173' of the present invention. Accordingly, the electrode tab stack 520 can, at times, be used interchangeably with electrode tabs 200-206 and 200'-206' as will be discussed infra.

The uncoated electrode tabs 52 permit for electrical connections but do not contribute to the electrical capacity of a battery 100. Therefore, the present invention folds each electrode tab 52 to make the volume occupied by the electrode tab stack 520 within a cell as small as is practical and the electrical connection to the electrode tab stack 520 as compact as possible. This thus allows the electrode active area stack 540 of the half stack 173, 173' to occupy a maximum possible volume within a cell thereby maximizing the power and capacity of the stack 175. As will be discussed infra, each electrode tab 52 attains good electrical contact when the electrode tabs 52 are compressed together into the electrode tab stack 520.

The electrode active area 54 of each electrode 50 is coated with slurry on both sides. Thus, the thickness of each electrode active area 540 in an electrode stack 500 is greater than the thickness of the electrode tab stack 520. Each anode (copper) electrode and cathode (aluminum) electrode pair is separated by a separator film 71 such as that made by ExxonMobil Corp. or Celgard, LLC of Charlotte, N.C. Stacks formed of a multiplicity of anode-separator-cathode groups create cell stacks. As a result, and using anode electrode tabs as an example, prior to being compressed into the half stacks 173, 173', see FIG. 6A, adjacent electrode tabs 52 in an electrode stack 500 are spaced apart by the sum of: the slurry coating on the face of the electrode, the separator, the slurry coating on the face of the adjacent cathode electrode, the cathode electrode foil thickness, the slurry coating on the opposite side of the cathode electrode, another separator layer, and the thickness of the slurry coating on the facing adjacent anode electrode.

The present invention provides a novel concept in bending or folding the electrode tab stack 520 to the electrode active area stack 540, while simultaneously, maintaining the plane 60 by the electrode tab stack 520 parallel to the plane 70. In this orientation, the electrical contact between the tabs in the electrode tab stack 520 can be maximized, the alignment of the tabs and any features such as holes in the tabs can be held in a constant juxtaposition to each other even though the tab stack is bent and the tab stack can be simultaneously folded tightly to occupy as little cell volume as possible.

Before describing the novel folding concept, edge planes are defined about electrode stack 500 to conceptualize the present invention, see again FIGS. 6A and 6B. First vertical plane 60 and second vertical plane 65 are defined by the ends of the tabs in the electrode tab stack 520 and by the bottom edges of the electrodes in the electrode stack 500, respectively and a horizontal plane 70 is shown as being parallel to the electrode active area stack 540. Prior to being formed into the electrode stack 173, 173' of the present invention, the planes 60, 65 of electrode stack 500 are parallel to each other and perpendicular to plane 70, see FIG. 6A. Plane 60, disposed adjacent electrode tab stack 520 is and remains normal to every electrode tab 52 in the electrode tab stack 520. Likewise, plane 65 is and remains normal to every electrode active area 54 in the electrode stack 500. Planes 60 and 65, however, need not remain normal to plane 70.

The electrode stacks 173, 173' of the present invention are realized by folding the electrode tab stack 520, so that plane 60 is substantially parallel to plane 70 and simultaneously perpendicular to each electrode tab 52. In order to keep each electrode tab 52 perpendicular to plane 60, a distance of at least twice the thickness of an electrode tab 52 must be maintained between adjacent electrode tabs 52. The thickness of the slurry coating on each face or electrode active area 54 of the electrode 50 and any intervening separator material, and the intervening opposite electrode contributes to creating a distance of at least twice the thickness of the electrode 50 between adjacent electrodes, 50.

Figure 1B:
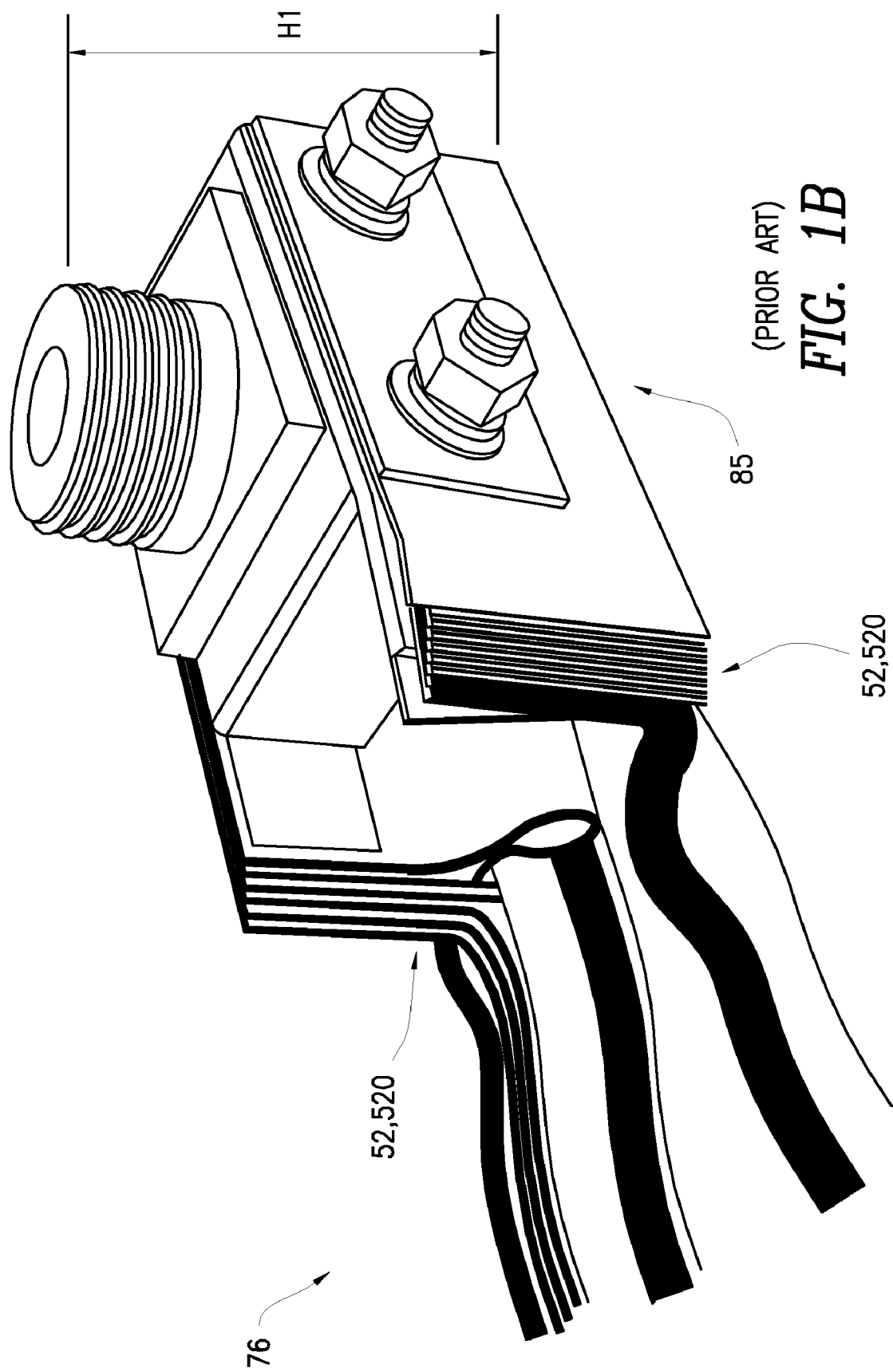
FIG. 1B shows a half electrode tab stack of the prior art battery shown in FIG. 1A.

Accordingly, the electrode tab stack 520 of the present invention not only occupies minimal volume in a battery, but also maintains good equal length and equal resistance electrical connections/contact between bent electrode tabs 52 due to the spacing requirements defined in the present invention. Here, electrode tabs 52 in an electrode stack 500 can be bent or folded while maintaining maximum electrical contact area between electrodes 50 and while maintaining equal electrical path length and electrical resistance for each tab in the stack from the active areas to the connection means all while keeping plane 60 parallel to plane 70 and perpendicular to plane 65. In contrast, the prior art does not maintain equal electrical path length or equal electrical resistance for each tab in the stack when plane 60 is brought parallel to plane 70, nor does it maintain maximum contact area between electrode tabs. See FIGS. 1A-1B.

Referring now to FIG. 6B, one advantage of keeping plane 60 parallel to plane 70 is to equalize the electrical resistance of all the electrode tabs 52 in the electrode tab stack 520 so that the current and power drawn from each electrode 50 in the electrode stack 500 is balanced. In this manner, maximum power is drawn from the electrode stack 175 and localized joule heating of any individual electrode 50 in the electrode stack 500 is minimized. As a result, power drawn from each electrode 50 is balanced, as will be discussed infra. A further advantage of keeping plane 60 parallel to plane 70, is that it allows the connection means, top bracket 182a and bottom bracket 182b, to be practically assembled to the electrode tab stack 520, using a fastener passing through holes in each of the electrode tabs, said holes remaining in alignment with each other in the folded state as a consequence of the inventive fold being described.

The novel folding concept of the present invention can be described and optimized with mathematical calculations used to calculate the folding of electrode tabs 52 of the electrode tab stack 520, defined herein as fold geometry calculations.

Figure 5A:
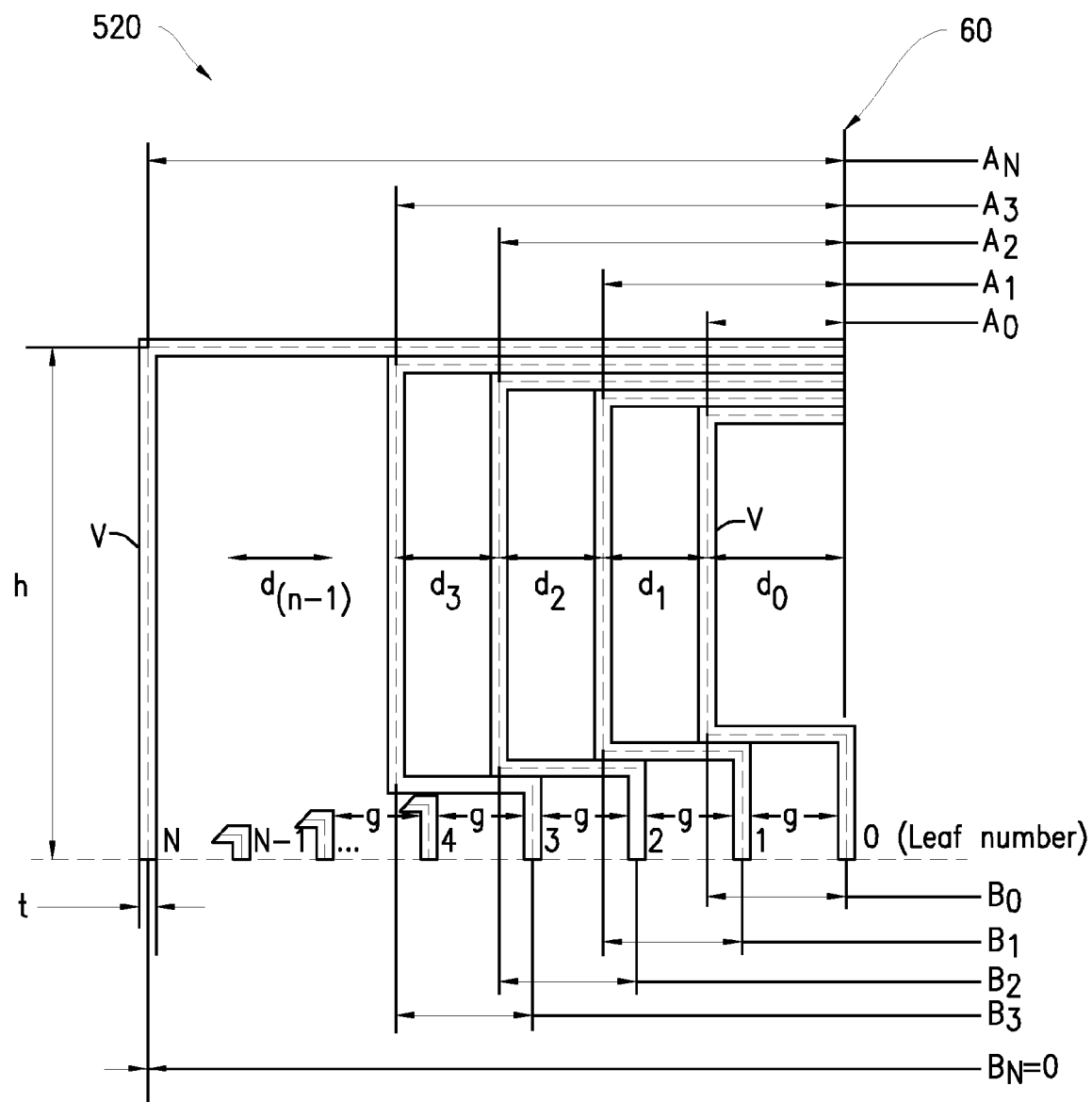
FIG. 5A is a side view of an illustrative half electrode stack of the present invention.

Looking to FIG. 5A, the fold geometry calculations for equal length electrode tabs may be defined as follows:

$$A_0 = B_0 = d_0 = (N) \times (g+t) - (N) \times t = (N) \times g$$

$$A_n = \left\lfloor \sum_{n=0}^{n}(d_n) \right\rfloor$$

$$B_n = \left\lfloor \sum_{n=0}^{n}(d_n) \right\rfloor - (n) \times (g+t),$$

for all $n$ from $n = 0$ to $n = N - 1$ $$B_N = 0,$$

$$L_0 = A_0 + B_0 + h - (N) \times t$$

$$L_n = A_n + B_n + h - (N-n) \times t,$$

for all $n$ from $n = 0$ to $n = N$.

Where:
"$A_0$" is electrode length along an upper horizontal portion of the innermost folded electrode tab;
"$B_0$" is electrode length of a horizontal lower portion of the innermost folded electrode tab;
"$d_0$" is distance from line 60, or a first edge, to the first vertical leg of the innermost folded electrode tab;
"$L_0$" is the length of the innermost folded electrode tab;
"$A_n$" is the electrode length along a upper horizontal portion of any folded electrode tab for all $0 < n \leq N$;
"$B_n$" is the length of a horizontal lower portion of any folded electrode tab, for all $0 < n \leq N$;
"n" is the index number of any specific individual electrode tab numbering 0 for the innermost tab in the fold to N for the outermost tab in the fold;
"N" is the number of outermost electrode tab in the fold counting the innermost tab as 0;
"t" is the thickness of any electrode tab, the thickness of the electrode tab being the same as the thickness of the electrode without any slurry coatings, the thickness of electrode tab being the same for all electrodes of the same type;
"g" is the gap between surfaces of the electrode tabs; "g" is the spacing between any two adjacent electrodes of the same type created by the coating thickness of opposing electrode active areas 54, separator material, and the intervening electrode of the opposite type, "g" is equal between adjacent electrodes of the same type; and
"h" is the arbitrary vertical height of the outermost folded electrode tab;
"$d_n$" is the distance between vertical legs of the tabs where n is the number of the specific electrode tab. It must be true that $d_n$ is greater than or equal to "t" for all n>0.
"$L_n$" is the length of each tab.
When all tabs are set to be equal in length, then $L_0 = L_1 = \ldots = L_N$.
Substituting the expression for $A_n$ and $B_n$ into the equation for length, $L_n$:

$$L_n = 2 \times \left\lfloor \sum_{n=0}^{n}(d_n) \right\rfloor - (n) \times (g+t) + h - (N-n) \times t$$

Recalling that all tab lengths are set to be equal, for any n such that $0 < n < N$ and subtracting any two adjacent tabs, $L_n$ from $L_{(n+1)}$, solves for $$d_{(n+1)} = \frac{g}{2}:$$

$$L_{(n+1)} - L_n = 0$$

$$L_{(n+1)} - L_n = 2 \times d_{(n+1)} - (g+t) + t$$

$$0 = 2 \times d_{(n+1)} - (g+t) + t$$

Thus:

$$2 \times d_{(n+1)} = (g+t) - t$$

$$d_{(n+1)} = \frac{g}{2},$$

for all n from n=0 to n=N.

Figure 5B:
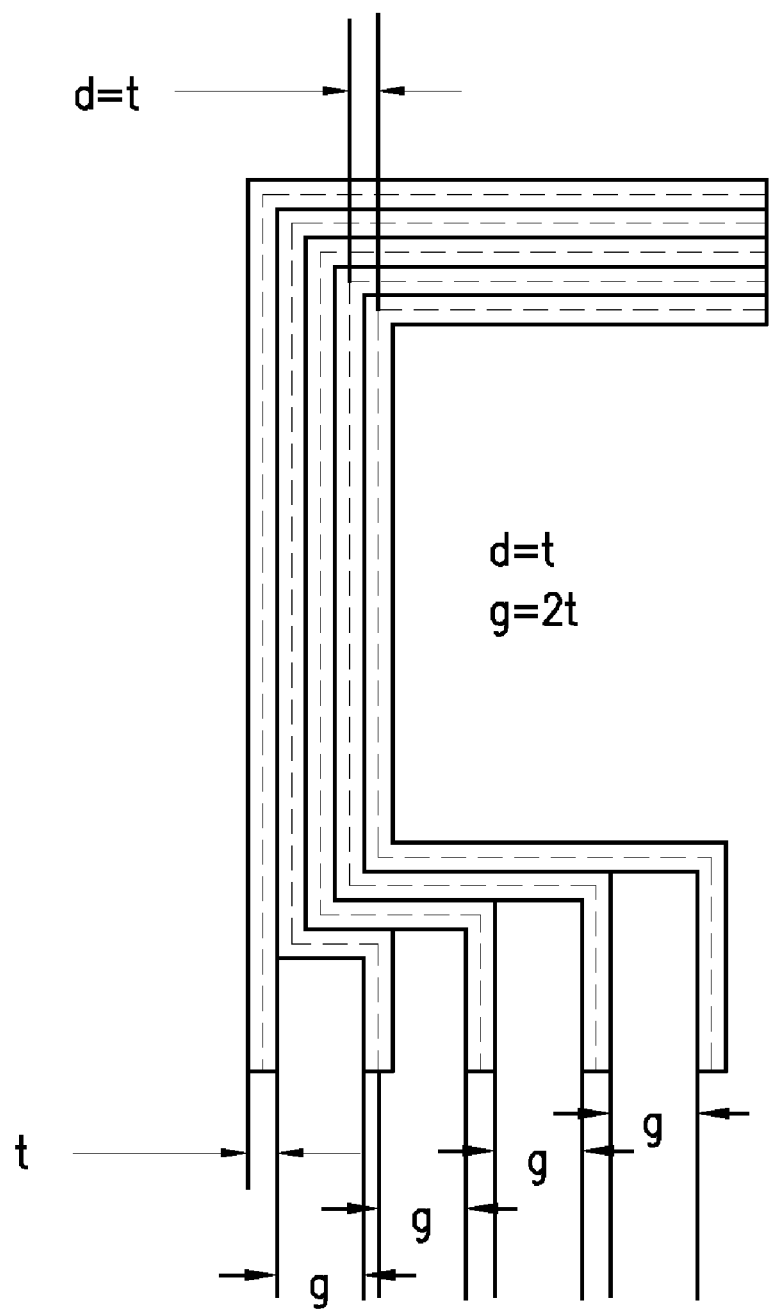
FIG. 5B is a side view of a half electrode stack of the present invention showing minimum spacing.

When we require that the length of all tabs be equal then the distance between any two adjacent tab vertical legs is g/2.
When $g=2 \times t$, then $d_{(n+1)}=t$, this is the minimum space "g" possible between electrode tabs of the same type that enables the inventive fold having equal length tabs, with maximum contact area between tabs along all horizontal legs $A_n$ and $B_n$ and along all vertical legs "V", providing the minimum volume fold. See FIG. 5B.

EXAMPLE

As an example, let N=9, g=0.1, t=0.05, h=1. This means that $$A_0 = B_0 = d_0 = (N) \times (g+t) - (N) \times t = (N) \times g = 9 \times 0.1 = 0.9$$

$$d_n = \frac{g}{2}$$

for all n from n from n=1 to n=N;
$d_n = 0.05 = d_1 = d_2 = d_3 = d_4 = d_5 = d_6 = d_7 = d_8 = d_9$
Thus:

$$A_N = \left\lfloor \sum_{n=0}^{n}(d_n) \right\rfloor = d_0 + d_1 + d_2 + d_3 + d_4 + d_5 + d_6 + d_7 + d_8 + d_9 =$$

$$d_0 + 9 \times 0.05 = 0.9 + 0.45$$

$$A_N = 1.35$$

$$A_n = \left\lfloor \sum_{n=0}^{n}(d_n) \right\rfloor = d_0 + n \times 0.05 = 0.9 + n \times 0.05$$

Thus:

$A_1 = 0.9 + 1 \times 0.05 = 0.95$ $A_2 = 1.0$ $A_3 = 1.05$ $A_4 = 1.1$ $A_5 = 1.15$ $A_6 = 1.2$ $A_7=1.25$ $A_8=1.3$ $A_9=A_N=1.35$ Also:

$$B_n = \left|\sum_{n=0}^{n}(d_n)\right| - (n) \times (g+t)$$

$B_1 =$ $$\left|\sum_{n=0}^{1}(d_n)\right| - (1) \times (g+t) = d_0 + d_1 - g - t = 0.9 + 0.05 - 0.1 - 0.05 = 0.8$$

Similarly:

$B_2 = B_1 + d_2 = 0.85$ $B_3 = B_2 + d_3 = 0.9$ $B_4 = B_3 + d_4 = 0.95$ $B_5 = B_4 + d_5 = 1.0$ $B_6 = B_5 + d_6 = 1.05$ $B_7 = B_6 + d_7 = 1.1$ $B_8 = B_1 + d_2 = 1.15$ $B_9 = B_N = 0$

Finally:

$$L_0 = L_1 = \ldots = L_N \text{ and:}$$

$$L_n = 2 \times \left|\sum_{n=0}^{n}(d_n)\right| - (n) \times (g+t) + h - (N-n) \times t = L_0$$

$$L_0 = A_0 + B_0 + h - (N) \times t = 0.9 + 0.9 + 1 - 9 \times 0.005 =$$

$$2.35 = L_1 = L_2 = L_3 = L_4 = L_5 = L_6 = L_7 = L_8 = L_9$$

The fold geometry calculations determines a bend geometry for each electrode tab 52 in the electrode tab stack 520 that is used to fold the electrode tab stack 520 into compact, low profile, electrode tab stacks 520 characterized by flat lying, tightly folded electrode tabs 52 with maximal contact area between all electrode tabs along the horizontal and vertical legs of the fold. Here, when electrode tab stack 520 is folded according to the fold geometry calculation, plane 60 is substantially parallel to plane 70. Accordingly, the fold geometry calculations fold electrode tab stack 520 so all edges of the electrode tabs 52, and any holes defined in the electrode tab stack 52 are aligned without crinkling, creasing or tearing any of the electrodes 50 or electrode tabs 52.

The fold geometry calculations can be computed using the thicknesses of various components of the half stack 173. For instance, the folding geometry calculations may be realized by taking into consideration anode tab thickness, anode coating thickness, separator thickness, number of anode or cathode electrodes (the number of anode electrodes may generally equal the number of cathode electrodes), cathode tab thickness, and cathode coating thickness, and separator thickness.

Some minimum gap between each electrode will provide enough extra folding space that the plane 60 can be brought parallel to the plane 70. According to the present invention, the minimum distance or gap (g) between the electrode tabs 52 must be at least twice the thickness (t) of an electrode tab 52. In a preferred embodiment, the minimum spacing is equal to twice the thickness of the electrode tab 52. Accordingly the minimum spacing between adjacent electrode tabs 52 of the same type is g=2 t.

Using the fold geometry calculations, the electrode tabs 52 are folded so all electrodes 50 travel equal path lengths ($L_n$) to the terminals 180. Thus, since the distance traveled by all electrode tabs 52 is equal in the half stack, the electrical resistance path for each electrode tab 52 is equal and the load across all the electrodes 50 is equal.

In a preferred embodiment, the lengths of the electrode tabs can be minimized by rounding all corners into curvilinear bends, without violating the equal length and equal resistance of the electrodes. Thus electrode tabs can be folded into sinuous curves to make the lengths of the electrode tabs substantially shorter than when electrode tabs are not folded into sinuous folds, or folded only at right angles. The reduction in electrode tab length makes the electrode as much as 78.5% of the length when folded at right angles, which is the same as the reduction in length realized between the perimeter of a square and the perimeter of a circle inscribed in said square. The reduction to 78.5% of the length when folded at right angles is represented by dividing the perimeter of said square, represented as 4×(length of one side of said square) into the perimeter of a circle, represented as Pi×(length of one side of said square), and obtaining the quotient 0.785 or 78.5%. Accordingly, the length of each electrode tab 52 in the electrode tab stack 520, can be reduced to a minimum to further reduce the volume of the fold.

Thus, by having the minimum spacing be at least twice the thickness of the electrode tabs 52 the path lengths to the terminal post 181 of all electrodes are equal and the resistance of all electrodes are equal. An important aspect of maintaining equal path lengths is that the resistance of each electrode tab 52 is equal, such that in the parallel circuit, the current flow in each electrode 50 is equal thereby balancing power from each electrode. Another advantage of maintaining equal path lengths is the alignment of features on adjacent electrodes in order to effect a good electrical joint by means of compression of the electrode tabs 52 against each other using a fastener.

As described above, the fold geometry calculation is a means for achieving low profile, folded electrode tabs having equalized electrical resistance path length. A means used to achieve connection of electrode tabs 52 having minimum resistance is by using connection means, which are used to join electrode tabs to each other. Connection means are also used to compress the electrode tab stack 520 together. By compressing the electrode tab stack 520 in a direction normal to plane 70, good, low resistance electrical joints are achieved. A preferred method for compressing the electrode tab stack 520 is accomplished using connection means, top bracket 182a and bottom bracket 182b, and one or more rivets. Other compression-inducing connection means may also be used such as nuts and screws. In addition, compression may be applied by a fixture, and connection accomplished by welding means such as spot welding, laser welding or gas shielded arc welding.

In one embodiment, the connection means or brackets 182a, 182b shown in FIGS. 2-4 are smooth, rectangular pieces having three holes. The two outer holes can be used to rivet or shirr brackets 182a and 182b of the terminal 180. The centermost hole is another riveting or connecting aperture dimensioned and configured to receive the terminal post 181. The connection means occupies a vertical space or height H2, which is less than the vertical height H1 occupied by the connection means in the prior art, compare to FIGS. 1A and 1B.

The use of the connection means in the present invention facilitates the folding of the electrode tab stack 520 in a compact manner to minimize the volume occupied by the electrode tab stack 520 when folded. The use of the connection means also permits each electrode tab 52 to lie flat against an adjacent electrode tab 52 for maximum electrical contact.

Referring back to FIG. 4, to assemble the electrode stack 175 of the present invention, two electrical connections are made using connection means. First, each electrode tab 52 is gathered to form an electrode tab stack 520 to make one electrical connection forming the tabs of the half stacks 173, 173'. Then the tabs 200, 202, 204, 206 of the half stack 173 are electrically connected with corresponding tabs 200', 202', 204', 206' of the half stack 173'. Specifically, tabs of half stack 173 and half stack 173' are folded to occupy minimal volume, using the fold geometry calculation of the present invention, and connected using terminal post 181 and connection means to achieve a low resistance electrical connection. Once the tabs are folded over the bottom bracket 182b, the top bracket 182a is disposed thereon and terminal post 181 is connected through a centermost hole of both brackets 182a and 182b. Additional connection means may be made through the brackets 182a, 182b on either side of post 181. Riveting and other means form a clamping force on the sandwiched electrode tab stack 520 to provide electrical paths of least resistance and thus provide good electrical connections. In certain embodiments, ends of the electrode tab stack 520 may be welded in lieu of or before rivets are made.

As mentioned above, the fold geometry calculation accounts for thicknesses of various components in the stack 175. The thickness of the bottom bracket 182b may also be taken into account in the fold geometry calculation to compute a suitable bend radius for all electrode tabs 52 and thus create a folding axis where electrode tabs 52 are folded into an electrode tab stack 520 having a compact, low profile. By using the fold geometry calculation of the present invention, the folding axis of all electrode tabs 52 will be equalized when folded over the bottom bracket 182b.

Brackets 182a and 182b, or the connection means of the present invention, are smaller than connection means 85 of prior art. Comparing FIGS. 1 and 3, height or vertical space H2 occupied by the low profile, compact folded tabs and the connection means of the present invention. Here, the vertical space H2 occupied by the bracket 182a, 18b is less than the height H1 of the connection means 85 and tabs of the prior art. The vertical space H2 is attributed to the connection means employed herein and to the fold geometry calculation used to fold the tabs into low profile, compact tabs. By using the connection means and/or and the fold geometry calculation of the present invention, internal battery space is conserved. As a result, more or larger battery stacks or electrodes are used in the battery 100 of the present invention and more power may be derived from the battery of the present invention rather than prior art batteries.

Figure 7A:
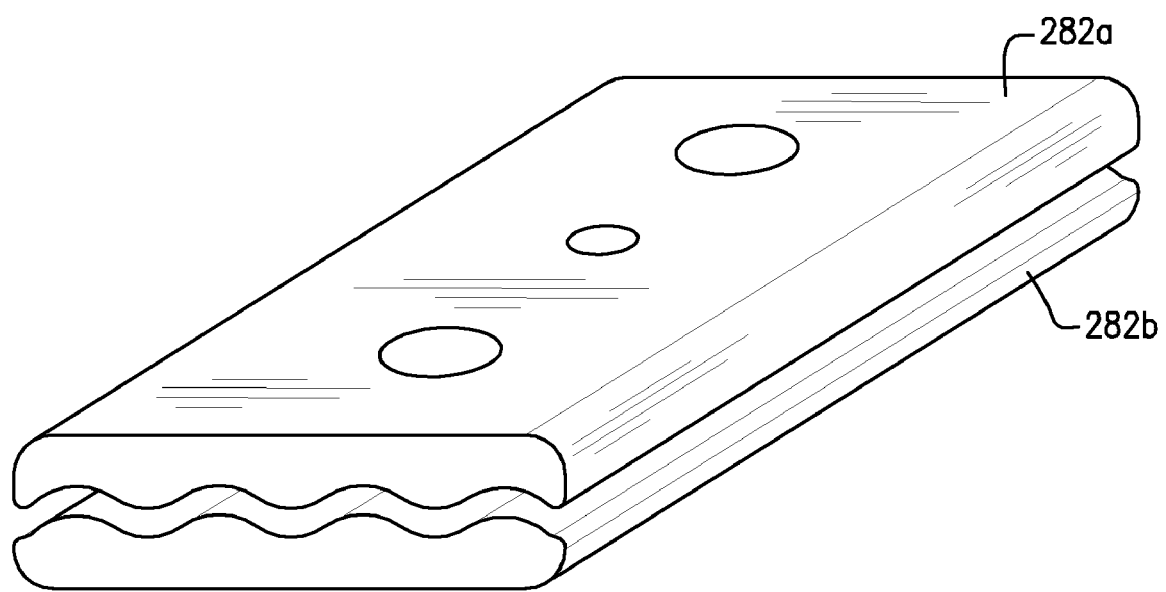
FIG. 7A is an alternative embodiment of brackets shown in FIGS. 2-5B.
Figure 7B:
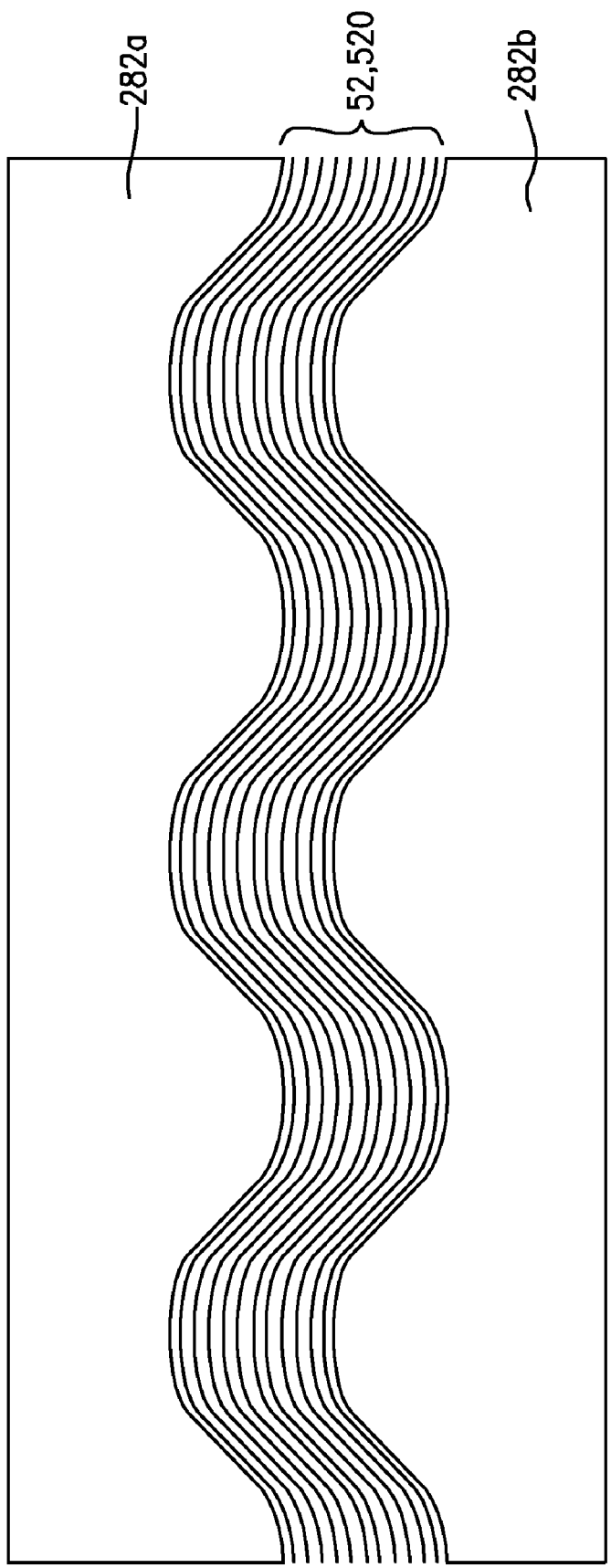
FIG. 7B is a front view of the alternative embodiment of brackets shown in FIG. 7A.

In an alternative embodiment, the connection means may be corrugated brackets 282a, 282b to increase surface area and thereby increase electrical connections for the electrodes. See FIGS. 7a and 7b. Corrugated brackets 282a, 282b compress the layers of the electrode tab stack 520 together rather than using a linear compression to improve electrical conductivity of the electrodes, specifically the electrode tabs 52 in the electrode tab stack 520. When the corrugated connection means is used, the electrode tab stack conforms to the hills and valleys of the corrugated connection means and the electrode tabs have a sinuous pattern.

Use of corrugated connections means or brackets 282a, 282b, forces adjacent electrode tabs in the electrode tab stack 520 to slide relative to adjacent electrode tabs under compression as the electrode tabs are progressively forced to conform to hills and valleys of the corrugated brackets. This sliding motion is an efficacious way to both remove or disrupt, by abrasion, the surface oxides on the surfaces of each electrode tab and expose un-oxidized metal to facilitate contact between adjacent electrode tabs. As a result, the sliding motion between the electrode tabs, the electrode tab stack and the corrugated connection means enhances electrical contact between oxidized surfaces than the electrical contact achieved in the prior art.

Stacks 175 having equalized electrical resistance paths may also be accomplished by the folding arrangements used to fold electrode tab stacks 520 into flat lying, tightly bent electrode tabs. The tabs 200, 202, 204, 206, 200', 202', 204', 206' of each half stack 173, 173' are folded so the electrical resistance paths of all electrode 50 are equal. Specifically, the resistance path length of any point on an electrode 50 must be equal up to the post 181. Here, equalized electrical resistance paths may be achieved by arranging the tabs in an overlapping and underlapping manner.

For instance, referring to the figures, aluminum tab 200' overlaps aluminum tab 200, while aluminum tab 202 overlaps aluminum tab 202'; both aluminum tab 200 and aluminum tab 202' are laid on the same bracket 182b. Then top bracket 182a sandwiches the tabs on the bottom bracket 182b. Copper tabs of the same stack 175 follow the same folding arrangement. Copper tab 204' overlaps copper tab 204 while copper tab 206 overlaps copper tab 206'. Both copper tab 204 and copper tab 206' are laid on a second bracket 182b and sandwiched by top bracket 182a. The described overlapping and underlapping folding arrangement may also be utilized even if each half stack 173, 173' has only two tabs, one copper tab and one aluminum tab. In an alternative embodiment, equalized electrical resistance paths may be achieved by overlapping and underlapping each electrode tab 52 in a half stack 173, 173' rather than each electrode tab stack 520 of the half electrode stack as described above.

In certain embodiments, holes may be punched into the tabs 200, 202, 204, 206, 200', 202', 204', 206' to bond them to each other and make an electrical connection and then make an electrical connection with the terminal 180. A bolt may be placed through the hole and screwed in tight to squeeze all layers or electrode tabs 52 together to get good electrical conductivity through the oxide layers. Here the oxide will be ruptured to achieve conductivity.

Figure 8A:
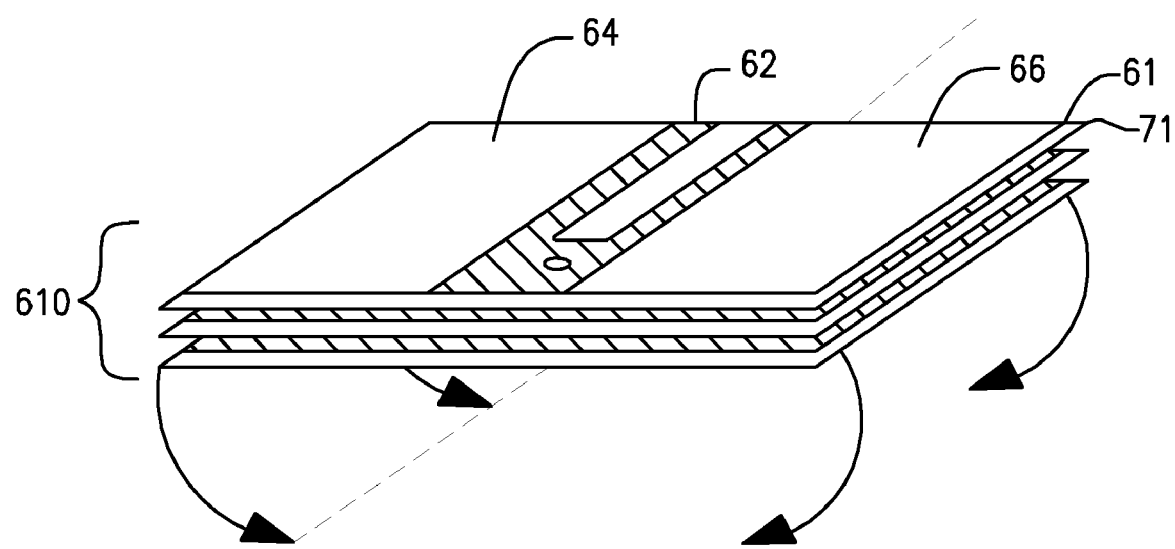
FIG. 8A is a view of an alternative embodiment of electrodes used in making an electrode stack of the present invention.
Figure 8B:
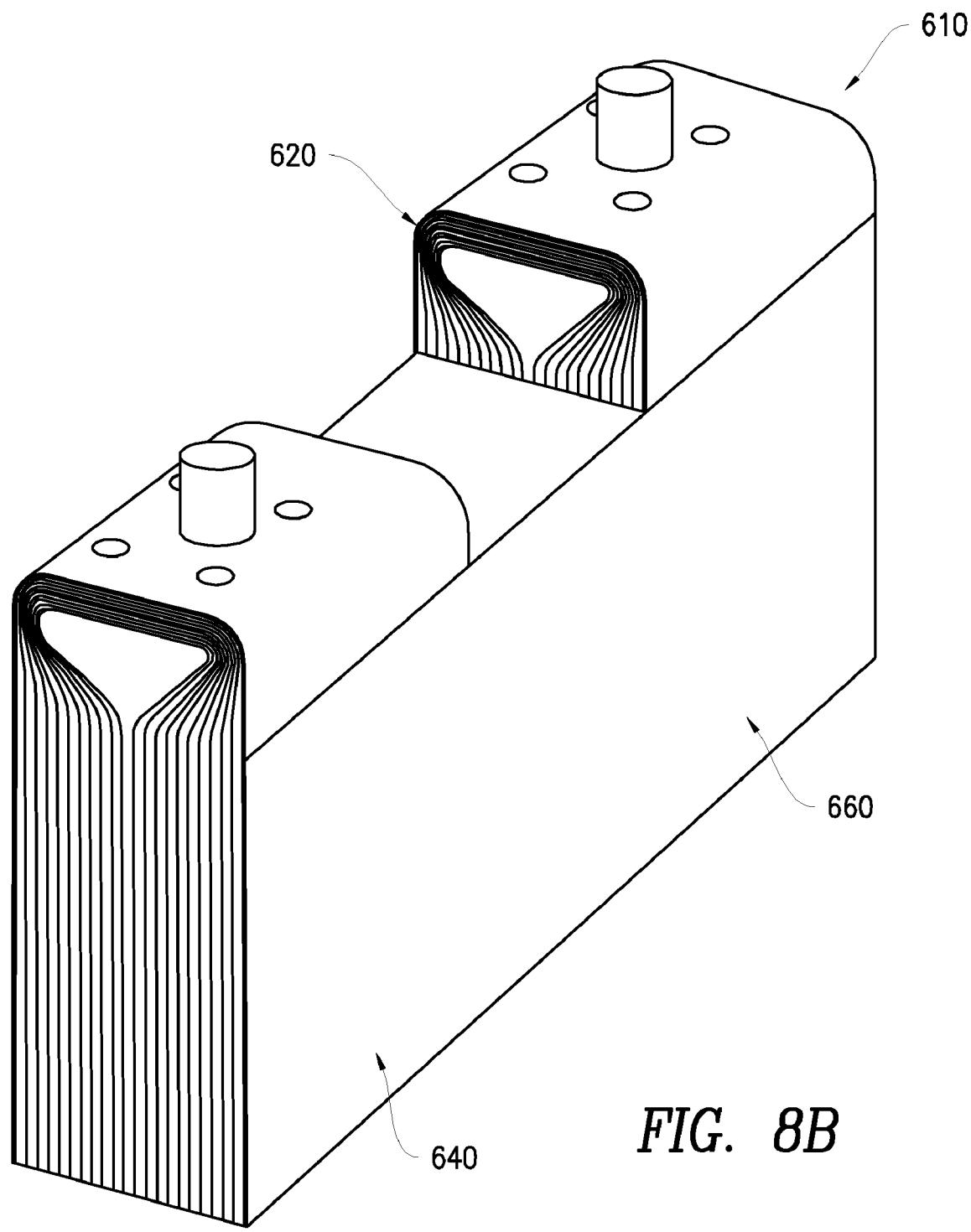
FIG. 8B is view of an alternative embodiment of an electrode stack of the present invention.

In an alternate embodiment, the electrode stack 175 may be formed using a plurality of single electrodes 61. See FIG. 8a and 8b comprising left and right active areas 64, 66, respectively, being slurry coated and a central tab portion 62, which is uncoated. The plurality of single electrodes 61 form a single electrode stack 610. In the stack 610, left and right active areas stacks are 640, 660, respectively and central tab portion stack is 620. The single electrode stack 610 comprises alternating single copper electrodes and single aluminum electrodes with the coated active areas 64, 66 of the electrodes 61 being separated by separating material 71. The single electrode stack 610 is then folded at the uncoated central tab portion 62 and tabs to which terminals 180 are attached may be punched therein.

The spacing between adjacent electrodes 61 is similar to the spacing between electrodes 50 described above. Therefore, all electrodes 61 of the resulting folded single electrode stack 610 have equal path lengths. The advantage of creating a battery cell according to the alternate embodiment is that the number of electrodes 61 in the single electrode stack 610 being connected to a terminal 180 can be reduced in half and provide the same amount of power as the prior art battery cells. Thus, the present invention reduces the number of electrical connection interfaces needed to make a good electrical connection. As it is known that, a good electrical connection is characterized by having low electrical resistance. In this alternative embodiment, the thickness of the single electrode tab stack 620 and the volume of the uncoated central portion 62 connected by the connection means, 182a, 182b are both reduced by half. As a result, the volume available within the cell for power producing portions, or coated active areas of the electrode stack increases.

The present invention provides a battery having less internal resistance than the prior art and a battery having decreased volume interconnection to a terminal. The internal resistance of the battery of the present invention depends on having low resistance internal connections. The present invention provides compact connections, maximum tab contact area and low resistance to connect electrodes together. Specifically, the electrode tabs are folded to lie flat and have a tight bend or a suitable bend radius so that the electrode tab stacks have a low profile. As a result, the electrode stacks 175 and thus electrode stack assembly 176 may be made larger than prior art electrode stacks 76 to occupy more internal battery space and thus provide more power within the battery.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims.

The invention claimed is:

1. A method of creating a battery having a decreased volume interconnection to a terminal comprising:
   providing at least one electrode stack comprising a plurality of electrodes, said electrode stack having an electrode active area stack comprising a plurality of electrode active areas and an electrode tab stack comprising a plurality of electrode tabs, each electrode having a thickness and each electrode tab having a tip, and the same length between the electrode active area and the tip, wherein all of the tips extend in a common direction;
   providing a space between adjacent electrodes;
   folding each said electrode tabs of said plurality of electrode tabs into a compact arrangement such that ends of all of the tips form a plane perpendicular to the common direction; and
   connecting said electrode tab stack to a connection means, wherein the electrode tabs are folded into the compact arrangement using formulae, $A_0 = B_0 = d_0 = (N) \times g$, $A_n = |\Sigma_{n=0}^{n}(d_n)|$, $B_n = |\Sigma_{n=0}^{n}(d_n)| - (n) \times (g+t)$, wherein said n is from n=0 to n=N-1, $B_N = 0$, $L_n = A_n + B_n + h - (N-n) \times t$, wherein said n is from n=0 to n=N, $d_{(n+1)} = g/2$, for all n from n=0 to n=N, wherein N is an outermost folded electrode tab, n is an index number of any specific individual electrode tab numbering 0 for an innermost folded electrode tab to said N, $A_0$ is an electrode length along an upper horizontal portion of the innermost folded electrode tab, $B_0$ is an electrode length of a horizontal lower portion of the innermost folded electrode tab, $d_0$ is a distance from a first edge to the innermost folded electrode tab, $A_n$ is an electrode length along a upper horizontal portion of any folded electrode tab for all $0<n \leq N$, $B_n$ is an electrode length of a horizontal lower portion of any folded electrode tab for all $0<n \leq N$, t is a thickness of any electrode tab, said t of any electrode tab being uniform for all electrodes of a same type, g is a gap between surfaces of the electrode tabs, h is a vertical height of the outermost folded electrode tab, $d_{(n+1)}$ is a distance between vertical legs of the electrode tabs, $L_n$ is a length of each electrode tab.

2. A method of claim 1, wherein said g is the gap between any two adjacent electrodes of a similar type.

3. A method of claim 1, wherein the space between adjacent electrode tabs of a similar type is at least twice the thickness of said electrode tab.

4. A method of claim 1, wherein the space between adjacent electrode tabs of a similar type is twice the thickness of said electrode tab.

5. A method of claim 1, wherein $d_n$ is greater than or equal to t for all n>0.

6. A method of claim 1, wherein all the electrode tabs are equal in length.

7. The method of claim 1, wherein an electrode path length for each electrode in said electrode stack are held equal to each other when connecting said electrode tab stack to the connection means, said electrode path length being defined as the distance between an end of the electrode active area and an end of the electrode tab at point of connection.

8. The method of claim 1, wherein said connection means is a corrugated clamp.

9. A method of claim 1, wherein the electrode tabs are folded into sinuous curves.

10. A method of claim 1, wherein the electrode tabs are folded into sinuous curves to make the lengths of the electrode tabs substantially shorter than when said electrode tabs are folded into right angles.

11. A method of claim 1, wherein the connections means is a two-piece bracket having corrugated surfaces, said corrugated surfaces clamping said electrode tabs of said electrode stack to provide good electrical connections.

12. A method of making a battery cell comprising:
   providing a plurality of electrodes creating an electrode stack, each electrode of said plurality of electrodes having an uncoated central portion and coated electrode active areas flanking said uncoated portion, said uncoated central portion capable of creating at least one electrode tab, said electrode tab having a thickness;
   aligning the uncoated central portion and the coated electrode active areas of each electrode of said electrode stack; and
   folding the electrode stack at the uncoated central portion of the plurality of electrodes, using formulae $A_0 = B_0 = d_0 = (N) \times g$, $A_n = |\Sigma_{n=0}^{n}(d_n)|$, $B_n = |\Sigma_{n=0}^{n}(d_n)| - (n) \times (g+t)$, wherein said n is from n=0 to n=N-1, $B_N = 0$, $L_n = A_n + B_n + h - (N-n) \times t$, wherein said n is from n=0 to n=N, $d_{(n+1)} = g/2$, for all n from n=0 to n=N, wherein N is an outermost folded electrode tab, n is an index number of any specific individual electrode tab numbering 0 for an innermost folded electrode tab to said N, $A_0$ is an electrode length along an upper horizontal portion of the innermost folded electrode tab, $B_0$ is an electrode length of a horizontal lower portion of the innermost folded electrode tab, $d_0$ is a distance from a first edge to the innermost folded electrode tab, $A_n$ is an electrode length along a upper horizontal portion of any folded electrode tab for all $0 \leq n \leq N$, $B_n$ is an electrode length of a horizontal lower portion of any folded electrode tab for all $0 < n \leq N$, t is a thickness of any electrode tab, said t of any electrode tab being uniform for all electrodes of a same type, g is a gap between surfaces of the electrode tabs, h is a vertical height of the outermost folded electrode tab, $d_{(n+1)}$ is a distance between vertical legs of the electrode tabs, $L_n$ is a length of each electrode tab.

13. A method of claim 12, wherein the space between adjacent electrode tabs of a similar type is at least twice the thickness of said electrode tab.

14. The method of claim 12, further comprising attaching connection means to the at least one tab.

15. The method of claim 14, wherein the connection means is a clamp.

16. The method of claim 14, wherein the connection means is a corrugated clamp.

17. The method of claim 13, wherein the electrode tabs are folded into sinuous curves to make the lengths of the electrode tabs substantially shorter than when said electrode tabs are folded at right angles.

* * * * *